(12) United States Patent
Mushen (10) Patent No.: US 7,040,249 B1
(45) Date of Patent: May 9, 2006

(54) ANIMAL FEEDING AND WATERING DEVICE

(76) Inventor: James Gerard Mushen, 909 Old Woostra Ct., Las Vegas, NV (US) 89145

(*) Notice: Subject to any disclaimer, the term of this patent is extended or adjusted under 35 U.S.C. 154(b) by 0 days.

(21) Appl. No.: 11/065,014

(22) Filed: Feb. 23, 2005

Related U.S. Application Data (60) Provisional application No. 60/601,573, filed on Aug. 13, 2004.

(51) Int. Cl.
*A01K 7/00* (2006.01)
*A01K 5/00* (2006.01)
*B65D 21/00* (2006.01)

(52) U.S. Cl. .................. 119/51.5; 119/72; 206/515

(58) Field of Classification Search .......... 119/52.1, 119/53.5, 54.5, 52.4, 61.5, 51.01, 72, 51.5; 220/574; 206/4.26, 503, 501, 515
See application file for complete search history.

(56) References Cited

U.S. PATENT DOCUMENTS

| | | | | |
|---|---|---|---|---|
| 867,621 A * | 10/1907 | Tannehill | ...................... | 119/77 |
| 2,755,644 A * | 7/1956 | Watson | ....................... | 206/502 |
| 3,455,280 A * | 7/1969 | Keene | ..................... | 119/61.55 |
| 3,653,362 A * | 4/1972 | Davis | ........................ | 119/61.5 |
| 3,720,184 A | 3/1973 | Pearce | | |
| 3,730,141 A * | 5/1973 | Manning et al. | ........... | 119/51.5 |
| 3,763,826 A * | 10/1973 | Portelli | ...................... | 119/52.1 |
| 3,791,550 A * | 2/1974 | Duncan | .................. | 220/23.86 |
| 3,972,419 A * | 8/1976 | Short | .......................... | 211/78 |
| 4,034,715 A * | 7/1977 | Arner | ........................ | 119/51.5 |
| 4,134,365 A * | 1/1979 | Futers et al. | ............... | 119/51.5 |
| 4,279,354 A * | 7/1981 | Conti | ....................... | 220/23.83 |
| 4,303,039 A * | 12/1981 | Thibault | ..................... | 119/52.1 |
| 4,513,688 A * | 4/1985 | Fassauer | .................... | 119/57.1 |
| 4,573,434 A | 3/1986 | Gardner | | |
| 4,840,143 A | 6/1989 | Simon | | |
| 4,889,078 A * | 12/1989 | Smiley | ....................... | 119/53.5 |
| 5,016,572 A * | 5/1991 | Weber et al. | .............. | 119/52.1 |
| 5,094,031 A * | 3/1992 | Lee | ............................... | 47/39 |
| 5,207,743 A * | 5/1993 | Costarella et al. | .......... | 220/574 |
| 5,309,670 A * | 5/1994 | Bates | ............................ | 47/71 |
| 5,497,885 A * | 3/1996 | Sussman | ..................... | 206/563 |
| 5,596,946 A * | 1/1997 | Bryant et al. | .............. | 119/52.1 |
| 5,636,592 A * | 6/1997 | Wechsler | .................... | 119/52.1 |
| 5,687,783 A * | 11/1997 | Finnegan | ..................... | 141/364 |
| 5,699,753 A * | 12/1997 | Aldridge, III | .............. | 119/52.1 |
| 5,711,248 A | 1/1998 | Boyd | | |
| 5,799,609 A * | 9/1998 | Burns et al. | .................. | 119/74 |
| 5,819,469 A * | 10/1998 | Hsu | ............................... | 47/39 |

(Continued)

*Primary Examiner*—Yvonne R. Abbott
(74) *Attorney, Agent, or Firm*—Law Office of Alan W. Cannon (57) ABSTRACT

A large capacity animal feeding and watering device having a serving tray (52) and a removable storage container (48) seated axially within the tray so as to deliver food or water to a serving dish (60). The tray has a number of removable wheels mounted thereunder which enables the device to be highly moveable by the user even when heavy and filled to capacity. The top of the container has a filling aperture (34) of sufficient size to enable access by an adult human hand to the interior of the container to fill or to clean. The same manufacturing molds are used in the production of both the feeding and watering device thereby reducing production costs. The container and the tray are designed to nest closely within other like components thereby decreasing the volume occupied in shipping and storage thus reducing costs.

20 Claims, 5 Drawing Sheets

U.S. PATENT DOCUMENTS

| | | | |
|---|---|---|---|
| 5,819,686 A * | 10/1998 | Credeur | 119/51.5 |
| 5,829,382 A * | 11/1998 | Garrison | 119/52.2 |
| D406,926 S | 3/1999 | Kolozsvari | |
| 6,055,932 A * | 5/2000 | Weber | 119/52.1 |
| 6,079,361 A | 6/2000 | Bowell et al. | |
| 6,209,487 B1 * | 4/2001 | Quinlan et al. | 119/51.01 |
| 6,378,460 B1 | 4/2002 | Skurdalsvold et al. | |
| 6,467,428 B1 * | 10/2002 | Andrisin et al. | 119/51.5 |
| 6,477,981 B1 | 11/2002 | Harper | |
| 6,655,084 B1 * | 12/2003 | Missry | 47/71 |
| 6,705,109 B1 * | 3/2004 | DeMars | 62/457.2 |
| 6,845,735 B1 * | 1/2005 | Northrop et al. | 119/52.1 |
| 6,863,025 B1 * | 3/2005 | Ness | 119/52.1 |
| 6,866,004 B1 * | 3/2005 | Lush | 119/52.1 |
| 6,880,484 B1 * | 4/2005 | Lee | 119/74 |
| 6,971,331 B1 * | 12/2005 | Rohrer | 119/77 |
| 2003/0029867 A1 * | 2/2003 | Vicknair | 220/23.87 |

* cited by examiner

ANIMAL FEEDING AND WATERING DEVICE

CROSS REFERENCE TO RELATED APPLICATIONS

This application claims the benefits of the filing date of provisional application No. 60/601,573, filing date Aug. 13, 2004

FEDERALLY SPONSORED RESEARCH

Not Applicable

SEQUENCE LISTING OR PROGRAM

Not Applicable

BACKGROUND OF INVENTION

1. Field of Invention

This invention relates to an animal feeding and watering device and specifically to a device that supplies food and water with improved ease of operation to move, fill and clean the device and an improved design for compact shipping and inventory.

2. Prior Art

Pet ownership, particularly of dogs and cats, is expanding worldwide. Multiple pet households are also increasing. Storing and delivering a greater quantity of fresh pet food and clean water to the pets is a growing challenge for pet owners. Traditional pet watering and feeding devices have expanded in variety but still lack in the areas of convenience, ease of use and maintenance as detailed in the following discussion focusing on pet watering devices followed by a discussion on pet feeding devices.

Pet Watering Devices:

Pet watering devices that supply greater quantities of fresh water, than the traditional pet watering dish, are in demand. One of the most popular watering devices is the gravity feed watering system. They are available in several water storage capacities and are generally low in cost and convenient.

Some common gravity feed watering systems use a 2 liter bottle or similar sized vessel, filled with water, as the water storage container. The storage bottle is then inverted into a drinking receptacle and the bottle neck is attached by a threaded connection or by some other means. The water then dispenses from the storage bottle into the pet drinking dish. As the pet drinks from the dish the water is replenished until the water storage bottle empties. To refill the device the process is repeated. U.S. Pat. No. 4,573,434 to Gardner (1986) discloses a common gravity feed watering device.

There are at least 4 inherent problems with this particular system. The first is encountered after filling the water storage bottle. When the bottle is filled and then inverted into the drinking receptacle, spillage inevitably occurs. The second problem is that after the bottle has been connected to the drinking receptacle and the drinking dish filled, spilling can occur if the watering device is lifted or moved. The third problem is that water leaves deposits and other impurities on the inside wall of the storage bottle, which is unhealthy for the pets. With a narrow opening at the bottle neck, there is no access for a hand to reach in to scrub and clean the inside of the bottle for sanitary maintenance. The fourth problem is that a 2 liter supply of water, in many situations, is not large enough. An active dog can drink approximately 90 milliliters of water per kilogram of body weight a day. One active dog weighing 20 kilograms (44 pounds) will have approximately one days supply of water with a 2 liter bottle (68 ounces). With multiple pet households on the rise, clearly a greater reservoir of water is desirable for many pet owners.

More current gravity feed watering devices have been developed with larger water storage capacities from 3.8 liters to over 18.9 liters. These large bottle watering devices generally operate on the same principles and with similar functionality as the small bottle watering devices. U.S. Pat. No. 3,720,184 to Pearce (1973), U.S. Pat. No. 5,687,783 to Finnegan (1997) and US Pat. D406,926 to Kolozsvari (1999) are all inventions that provide a greater supply of water but have similar problems as the smaller watering devices plus some new issues.

Many of the problems associated with the large bottle animal watering devices have to do with the weight of the bottle when filled with water. A standard 18.9 liter water bottle weighs over 18.9 kg (42 pounds). After the user fills this bottle, the combined weight of the water plus the weight of the bottle itself must be lifted, inverted and inserted back into the base receptacle. This is a difficult and awkward process for most people and places strain on the arms, legs and back muscles. Again spillage occurs from the mouth of the bottle during this filling, inverting and insertion process. This spillage can be considerable especially if the user does not insert this heavy bottle into the drinking receptacle quickly and accurately. The drinking receptacle components have a tendency to move and separate if the weight of the bottle is not properly distributed when inserted, causing more spillage. In addition these bottles are typically made of plastic or glass so if they are accidentally dropped during this filling process they can easily crack or break.

Some inventors have created animal watering devices with water storage containers that can be filled from the top. U.S. Pat. No. 5,711,248 to Boyd (1998) and U.S. Pat. No. 6,079,361 to Bowell/Peterson (2000) have disclosed animal watering devices that can be filled through a narrow aperture at the top of the storage container. Both inventions however retained some of less desirable characteristics of the large container systems. The filling apertures are narrow so scrubbing and cleaning the interior wall of the container remains a problem. Another issue that remains is portability. These systems are heavy at full capacity and extremely awkward to move or reposition.

Still another problem with all the large capacity watering systems is that they are costly to ship and inventory because of the ample volume they occupy. Whether they are shipped in a container, by rail car or tractor trailer, the primary determinant of the shipping cost is the volume being shipped. As a result there is a need to ship as much product as possible in a given volume. Similarly in most retail locations, shelf space is at a premium. Retailers seek to have a broad range of products with limited storage space. Many mass retailers will not accept products that cannot be shipped and inventoried in a compact manner. An 18.9 liter bottle has a volume of 18.92 cubic centimeters (0.67 cubic feet). To ship a quantity of 100 would require 1892 cubic centimeters (67 cubic feet). This is a problem for the large capacity watering devices. Because of their design they are generally packaged and shipped individually, limiting the load quantities, thereby increasing costs.

Pet Feeding Devices:

Storage and feeding devices for dry pet food come in many varieties, shapes and sizes. There are generally 2 divergent methods for feeding a pet. The first method is to provide your pet a constant supply of food with a feeding device that has a storage container which automatically replenishes the feeding dish as the food is consumed. The most popular are gravity feed devices for their low cost and convenience. The second method is to manually feed your pet, taking food from a storage container directly to a feeding dish. Most veterinarians agree that a measured and controlled amount of food for your pet mitigates some of the health problems that may occur from a pet that over eats. Many pet owners follow this method. Both feeding methods and devices have there limitations and problems.

There are several concerns with the gravity feed devices. These feeders typically have a food storage container with an opening at the bottom that directs food into a pet feeding dish. As the pet eats, the dish is automatically replenished with food until the storage container supply is depleted. This enables the pet to eat from the dish and have access to the entire volume of food in the storage container. U.S. Pat. No. 6,477,981 to Harper (2002) and U.S. Pat. No. 4,840,143 to Simon (1989) are typical of these feeders.

The first concern is that veterinarians agree that most animals, especially pets such as dogs and cats, have specific nutritional requirements based on age, activity level, size and weight. Many brands of dry dog food for example, will include feeding information based on the dog's age, size and weight. Pets with unlimited access to a food source tend to overeat which can lead to obesity and a range of pet diseases.

Another concern with the gravity feed device is that it attracts other animals and insects. These feeders are an open food source and tend to attract hungry animals such as a neighbors pet or rogue animals such as coyotes or possums which can harm pets. Insects, especially ants, are also attracted which can lead to infestation and food spoilage problems.

Still another concern with gravity feed device is the exposure to the elements. Food that is exposed to air becomes stale and can become spoiled when exposed to rain or other elements.

There are concerns with manual feeding devices. These devices are typically comprised of a food storage container and a separate feeding dish. After filling the feeding dish many pets (especially dogs) tend to move and push the dish away from the storage container when eating or playing, occasionally spilling the dish and making the dish difficult to find at the next feeding time Another concern is that the food storage containers come in a variety of capacities, and similar to the watering devices, portability is an issue. A large dog food bag that weighs 20 kilograms (44 pounds) emptied into a storage container makes that container heavy and very difficult to move and reposition which can be inconvenient.

Another problem is that most animal feeding devices have containers that are not air-tight which allows the food to become stale and loose some of its nutritional value. It can also provide access to insects.

All of the large capacity animal feeding devices, as with the watering devices, heretofore known, are bulky and need to be packaged separately for shipping and storage. U.S. Pat. No. 6,378,460 to Skurdalsvold/Vanskiver (2002) recognized this problem. They disclosed two food dispensers that can be packaged together, but they still nevertheless occupy substantial volume so shipping and inventory costs remains an issue.

OBJECTS AND ADVANTAGES

Broadly, it is an object of the present invention to provide large capacity storage and dispensing device for dry pet food and water that is easy to use, maintain and reduces manufacturing and shipping costs.

Specifically several objects and advantages of the present invention are:

(a) to provide a large volume animal feeding and watering device with a storage container that can be filled from the top while it remains seated within the serving tray, thus eliminating the need to lift and invert the heavy storage container and the subsequent spillage;

(b) to provide an animal feeding and watering device which has a storage container that has easy access to the interior to scrub and clean away residue and impurities left by the water or feed;

(c) to provide an animal feeding and watering device that is portable and can be easily moved and repositioned particularly when heavy and filled to capacity;

(d) to provide an animal feeding and watering device that has an air-tight seal which keeps the food fresh and safe from the elements and predators;

(e) to provide an animal feeding and storage device where the feeding dish is conveniently located next to the storage container;

(f) to provide an animal feeding and watering device that is designed to have the storage container nest closely within other storage containers and the serving tray nest closely within other serving trays thereby decreasing the volume occupied in shipping and storage thus reducing costs;

(g) to provide an animal feeding and watering device that use similar molds in the manufacturing process to reduce production costs associated with multiple runs of different molds; and (h) to provide a large volume animal feeding and watering device that is simple to use, maintain and inexpensive to manufacture.

Further objects and advantages of the present invention will become apparent from a consideration of the drawings and ensuing description.

SUMMARY

In accordance with the present invention, one embodiment is a large capacity animal food and watering device that is easy to fill, clean and move. The design enables the device to be manufactured as a pet feeder and as a pet waterer with little modification, using the same molds. In addition the components of the device are designed to nest tightly within other like components lowering shipping and inventory costs.

DRAWINGS—FIGURES

FIG. 5 is a side, orthogonal, sectional view of the pet feeding and watering device of FIG. 5a taken at the sectioning plane and in the direction indicated by line 5 of FIG. 5a;

FIG. 7 is a side orthogonal, sectional view of FIG. 7a, taken at the sectioning plane and in the direction indicated by line 7 of FIG. 7a;

FIG. 8 is a side orthogonal, sectional view of FIG. 8a, taken at the sectioning plane and in the direction indicated by line 8 of FIG. 8a;

FIG. 9 is a side orthogonal, sectional view of FIG. 9a taken at the sectioning plane and in the direction indicated by line 9 of FIG. 9a;

FIG. 10 is a side orthogonal, sectional view of FIG. 10a taken at the sectional plane and in the direction indicated by line 10 of FIG. 10a;

| DRAWINGS—Reference Numerals | |
|---|---|
| 20. | lid |
| 22. | o-ring |
| 24. | recess |
| 26. | female threads |
| 28. | top section |
| 30. | top edge |
| 32. | male threads |
| 34. | filling aperture |
| 36. | inside container wall |
| 38. | outside container wall |
| 40. | bottom container wall |
| 41. | gravity feed aperture |
| 42. | water release aperture |
| 44. | stop |
| 46. | lower section |
| 47. | storage container double wall |
| 48. | storage container |
| 49. | gravity feed container |
| 50. | animal feeding and watering device |
| 52. | serving tray |
| 53. | serving tray double wall |
| 54. | inside tray wall |
| 56. | outside tray wall |
| 58. | bottom tray wall |
| 60. | serving dish |
| 62. | receiving compartment |
| 64. | container support section |
| 66. | tray ledge |
| 68. | sloping ramp |
| 70. | tray cavity |
| 71. | container cavity |
| 72a | left front wheel |
| 72b | right front wheel |
| 72c | left rear wheel |
| 72d | right rear wheel |

DETAILED DESCRIPTION—FIGS. 1, 3, 4, 5, 7, 8 PREFERRED EMBODIMENT

An appreciation of various aspects of the invention is best gained through a discussion of an application example. Accordingly an example embodiment of the present invention, an animal feeding and watering device 50 which is convenient to use and lowers manufacturing and shipping costs, is provided.

Figure 1:
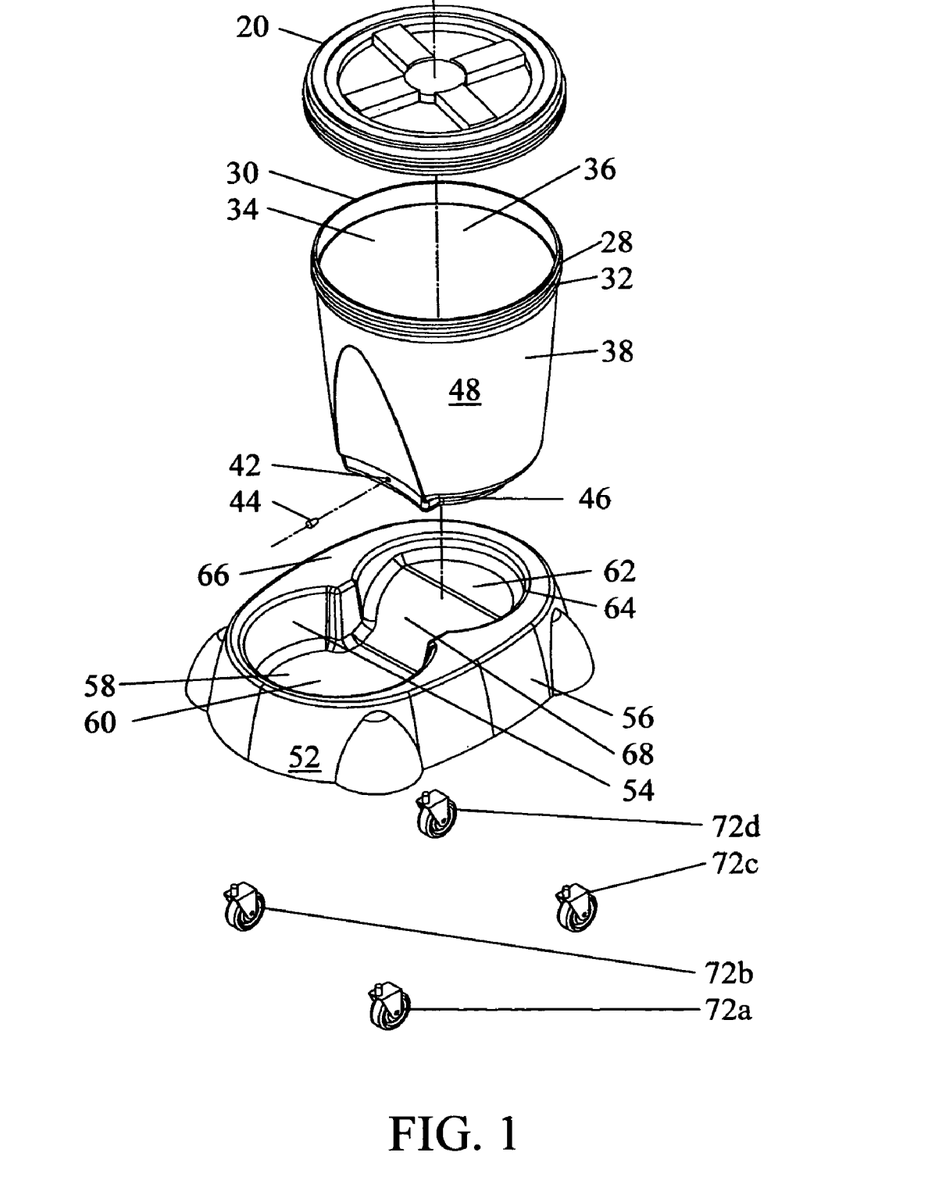
FIG. 1 is an exploded perspective view of an unassembled animal feeding and watering device, according to an example embodiment of the present invention.

Attention is directed to FIG. 1. FIG. 1 is an exploded perspective view of an unassembled animal feeding and watering device 50, according to an example embodiment of the present invention. Device 50 broadly comprises a serving tray 52, base or receptacle from which the pet may eat or drink, a storage container 48, tank, or vessel which is filled with water or food and serves as the supply to tray 52 and a removable sealing mechanism, lid 20, top or cover that seals container 48.

The initial discussion will focus on tray 52. Tray 52 is adapted so as to rest securely on a flat surface, for example the floor of a residence, garage or porch. Tray 52 having a bottom wall 58 member that is secured orthogonally to a plurality of side wall members forming a forward feeding compartment, fashioned into a serving dish 60. Dish 60 is configured to dispense food or water and to permit the pet to feed itself by lowering its face into dish 60. Tray 52 further includes a rearward receiving compartment 62 configured to receive and axially support an outside container wall 38 of container 48.

Figure 5:
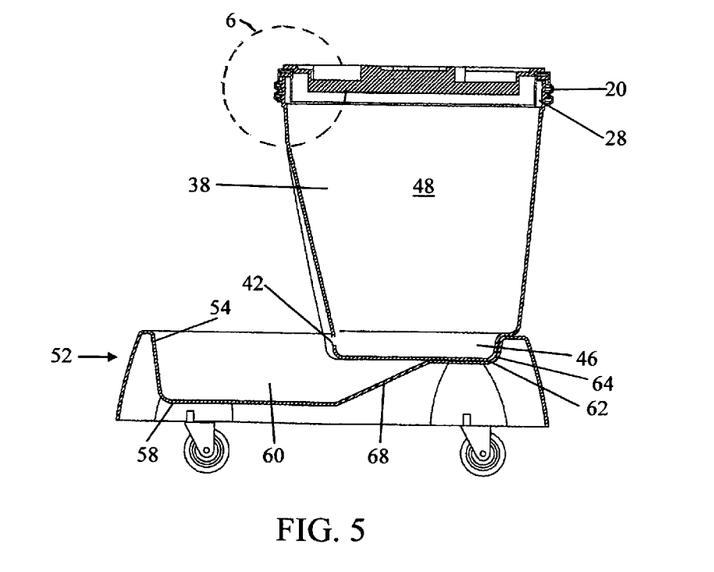
Figure 5A:
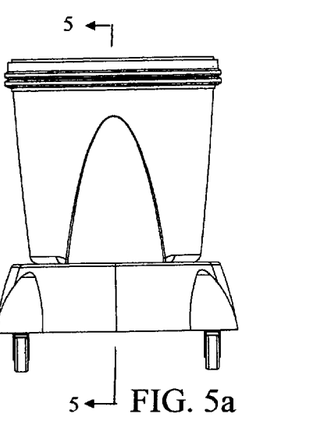
FIG. 5a is an orthogonal front view of the pet feeding and watering device.

Compartment 62 has a tray ledge 66 at the top that is flat and is fashioned into a generally circular container support section 64 as shown in FIG. 1. In the preferred embodiment, but not by way of limitation, support section 64 is adapted for frictionally holding a lower section 46 of container 48 and is dimensioned to conform thereto. An inside tray wall 54 defining dish 60 and compartment 62 is interrupted at the rear and the front of these compartments respectively, in order to permit communication there between. Attention is directed to FIGS. 5 and 5a. FIG. 5 is a side orthogonal, sectional view of the pet feeding and watering device of FIG. 5a, taken at the sectioning plane and in the direction indicated by line 5. FIG. 5 shows that bottom tray wall 58 of compartment 62 is made higher than bottom tray wall 58 of dish 60. This permits the formation of a downwardly and forwardly sloping ramp 68 which directs water and food arriving in compartment 62 into dish 60.

Figure 8:
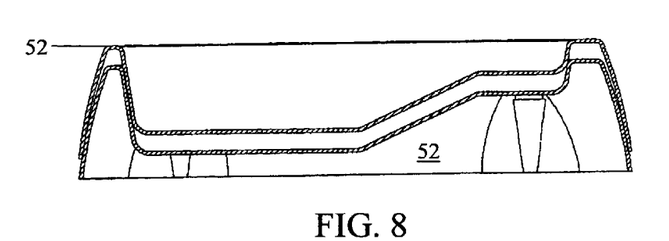
Figure 8A:
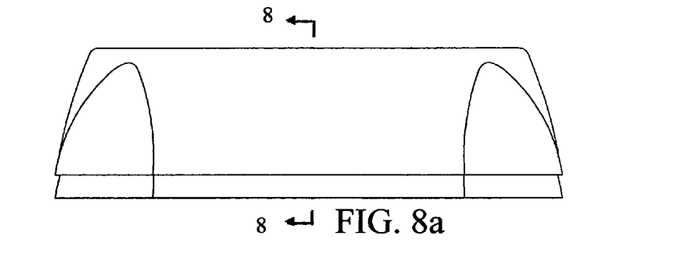

Tray 52 can be shaped in many designs. In the preferred embodiment, but not by way of limitation, tray 52 is generally oval shaped. Attention is now directed at FIGS. 8 and 8a. FIG. 8 is a side orthogonal, sectional view of FIG. 8a, taken at the sectioning plane and in the direction indicated by line 8 of FIG. 8a. FIG. 8 illustrates two trays 52 nesting closely within each other, an important aspect of the shape of the present invention. Tray 52 is dimensioned to nest closely within other said trays thereby decreasing the volume occupied in shipping and storage thus reducing costs.

Figure 10:
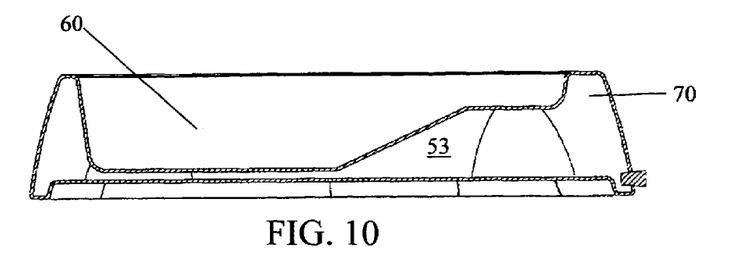

Tray 52 can be constructed from a variety of materials for example metal, plastic, glass or ceramic. In the preferred embodiment, but not by way of limitation tray 52 is made of a plastic material of one piece, molded construction. Alternatively tray 52 can be made with double wall construction. Attention is now directed at FIGS. 10 and 10a. FIG. 10 is a side orthogonal sectional view of FIG. 10a, taken at the sectional plane and in the direction indicated by line 10 of FIG. 10a. FIG. 10 depicts the alternative embodiment of the serving tray using double wall construction. FIG. 10, a serving tray 53 using double wall construction will be discussed in detail in the following additional embodiments.

Attention is now directed to FIG. 1. In the preferred embodiment, but not by way of limitation, tray 52 further comprises a number of removable wheels 72a, 72b, 72c, 72d or castors mounted thereunder. This enables device 50 to be mobile and easily moved from one site to another by the user as such is desired or required. In the preferred embodiment the wheels diameter is between 2.54 centimeters (1 inch) to 8.89 centimeters (3.5 inches), and preferably 3.81 cm (1.5 inches) constructed of rubber, nylon, polyurethane or plastic. The wheels can be of any size and constructed of any material dictated by the desired use of device 50.

In the preferred embodiment, but not by way of limitation, container 48 is available in different sizes from 3.8 liters to 38 liters. Tray 52 will be sized to accommodate any of these container capacities or others.

Figure 3:
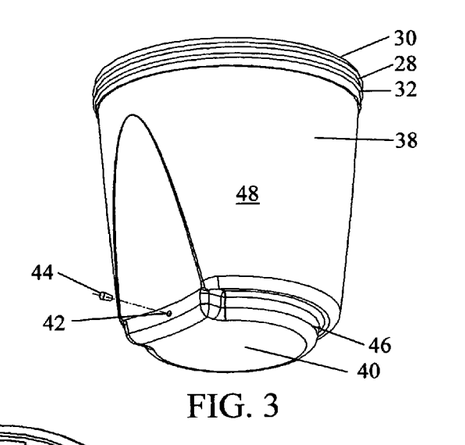
FIG. 3 is a perspective view of a water storage container according to an example embodiment of the present invention.

Discussion will now focus on container 48 and attention is now directed at FIG. 3. FIG. 3 is a perspective view of water storage container 48 according to an example embodiment of the present invention. In FIG. 3, container 48 broadly comprises a bottom container wall member 40, lower section 46, a top section 28 and a plurality of side wall members. As seen in FIG. 1, a filling aperture 34 is located within top section 28 and lid 20 covers filling aperture 34. Container 48 extends axially above serving tray 52.

Top section 28 of container 48 has a top edge 30 or lip which encircles filling aperture 34. Filling aperture 34 is the opening used to fill container 48 with food or water and also provides access to an inside container wall 36 for easy cleaning.

Figure 6:
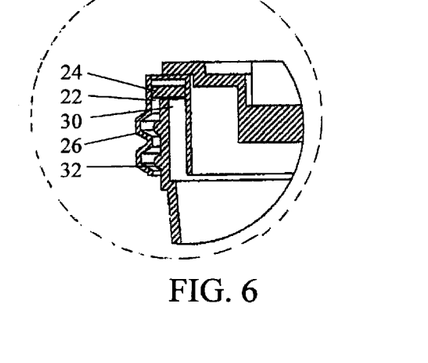
FIG. 6 is a partial, sectional, enlarged view of the lid engaged with the top section of the storage container according to an example embodiment of the present invention.

Top section 28 of container 48 can be of any shape or size. Filling aperture 34 on top section 28 of container 48 is of sufficient size to accommodate access by an adult human hand for filling or cleaning inside container wall 36 of container 48. Preferably top section 28 is circular or round and has a diameter between 13.97 cm (5.5 inches) and 36.83 cm (14.5 inches) and typically has a diameter of 30.48 cm (12 inches). Top section 28 also includes integral male threads 32 around its outside circumference. Attention is directed to FIG. 6. FIG. 6 is a partial, sectional, enlarged view of lid 20 engaged with the top section 28 of container 48. FIG. 6 shows male threads 32 engaging with female threads 26 located on the inside circumference of lid 20 when lid 20 is screwed on, sealing container 48.

Attention is directed at FIG. 3. I presently prefer, but not by way of limitation, lower section 46 including a water release aperture 42, port or orifice. Release aperture 42 can be of any size desired. Preferably release aperture 42 has a diameter between 0.64 cm (¼ inch) and 2.54 cm (1 inch) and typically is 1.27 cm (½ inch). Lower section 46 further includes a removable stop 44, plug or cap that inserts into release aperture 42 creating an air tight seal. Stop 44 can be constructed of any material desired for example cork, rubber, plastic or metal. Alternatively any openable and closeable port system, faucet or spigot dictated by the desired use of device 50 can be used.

Attention is directed to FIGS. 5 and 5a. FIG. 5 is a side orthogonal, sectional view of the pet feeding and watering device of FIG. 5a, taken at the sectioning plane and in the direction indicated by line 5 of FIG. 5a. FIG. 5 illustrates that lower section 46 of container 48 contours to the shape of support section 64 of tray 52. Lower section 46 circumference is dimensioned slightly less than circumference of inside tray wall 54 of support section 64 which enables container 48 to be seated and frictionally supported therein.

FIG. 5 also shows that release aperture 42 is oriented facing dish 60 and slightly lower than the top of inside tray wall 54 in the preferred embodiment.

Container 48 can be shaped in a variety of designs for example a cylinder, rectangle, hexagonal or octagonal. In the preferred embodiment but not by way of limitation, container 48 is generally conical in shape with top edge 30 having the widest circumference and outside container wall 38 minimally tapering inward to lower section 46.

Figure 7:
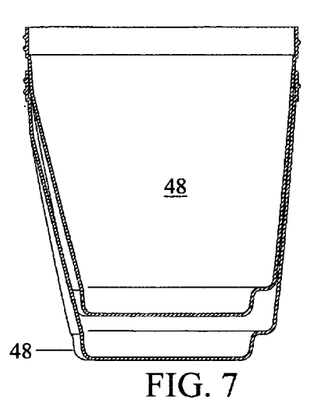
Figure 7A:
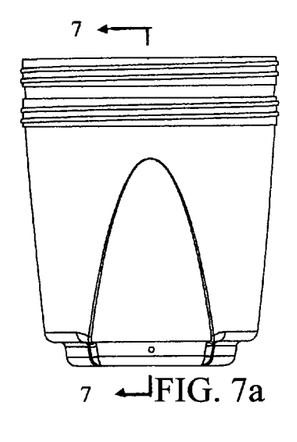
FIG. 7a is an orthogonal front view of two storage containers nesting closely within each other.

Attention is now directed at FIGS. 7 and 7a. FIG. 7 is a side orthogonal, sectional view of FIG. 7a, taken at the sectioning plane and in the direction indicated by line 7 of FIG. 7a. FIG. 7 illustrates an important aspect of the shape of the present invention. Container 48 is dimensioned to nest closely within other said containers thereby decreasing the volume occupied in shipping and storage thus reducing costs.

Container 48 can be of any size dictated by the desired use of device 50. Preferably container 48 holds between 3.8 liters and 38 liters, and typically holds 18.9 liters.

Figure 9:
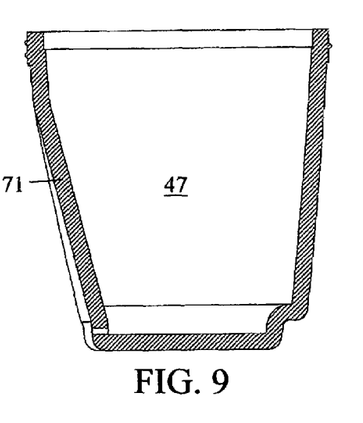
Figure 9A:
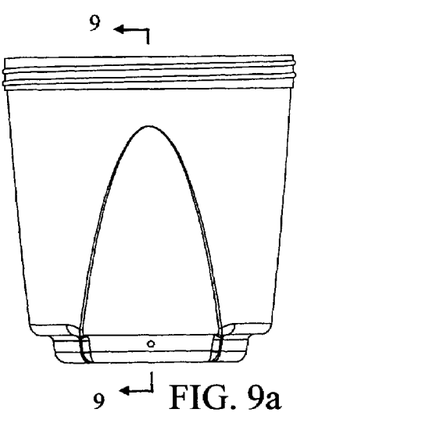
FIG. 9a is an orthogonal front view of the alternative embodiment of the storage container using double wall construction.

Container 48 can be constructed from a variety of materials for example metal, plastic, glass or ceramic. In the preferred embodiment, but not by way of limitation, container 48 is made of a plastic material of one piece molded construction. Alternatively container 48 can be made with double wall construction. Attention is now directed to FIGS. 9 and 9a. FIG. 9. is a side orthogonal sectional view of FIG. 9a, taken at the sectioning plane and in the direction indicated by line 9 of FIG. 9a. FIG. 9 illustrates the alternative embodiment of the storage container using double wall construction. FIG. 9, a storage container 47 using double wall construction will be discussed in detail in the following additional embodiments.

Discussion will now focus on lid 20 and attention is now directed at FIGS. 5 and 6. In the preferred embodiment illustrated, lid 20 is generally round or circular in shape and dimensioned slightly larger than top section 28 of container 48. Lid 20 includes female threads 26 around the inside circumference. Lid 20 further includes a recess 24 located above threads 26 and a compressible o-ring 22, seal or gasket located within recess 24. O-ring 22 is preferably a soft plastic or rubber material which can provide an air-tight seal when compressed. Lid 20 is screwed onto top section 28 of container 48. The design is such that female threads 26 of lid 20 engage with male threads 32 of container 48. Top edge 30 of container 48 then compresses o-ring 22 in lid 20 creating an air-tight seal.

Lid 20 can be constructed from a variety of materials for example metal or, plastic. In the preferred embodiment, but not by way of limitation, lid 20 is made of a plastic material of one piece molded construction and circular in shape. Lid 20 alternatively can have double wall construction.

Alternatively top section 28 and lid 20 do not require male threads 32 and female threads 26, any method of attaching lid 20 to top section 28 may be utilized. For example container 48 can have a rectangle shape with a rectangle shaped top section 28. Lid 20 could have a similar rectangle shape with approximately the same diameter that would create a tight fit when it is slid over top section 28. By the term tight fit it is meant that the cover is held in place over the top of the storage container by friction. Alternatively lid 20 could be clamped over top section 28 with a variety of locking mechanisms creating an air-tight seal.

Figure 4:
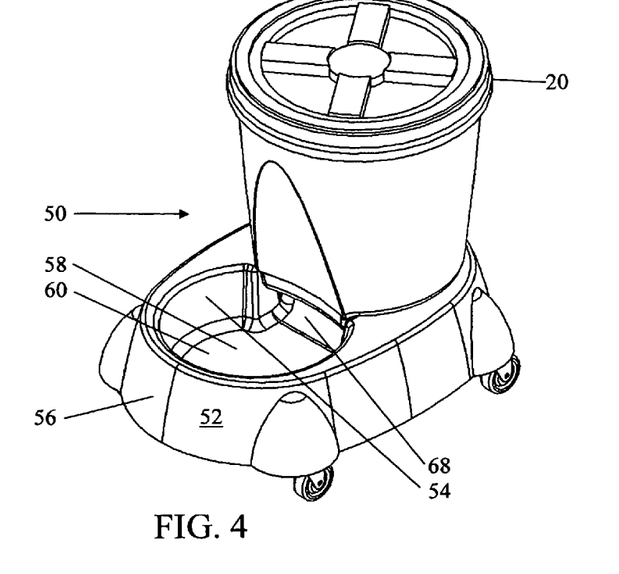
FIG. 4 is a perspective view of an assembled animal feeding and watering device according to an example embodiment of the present invention.

Operation—FIGS. 1, 4

In operation of device 50 attention is directed at FIGS. 1 and 4. To fill device 50, the user first rolls device 50 to the food or water source. If more convenient the user can remove container 48 from tray 52 and carry container 48 to the source.

In operation as a WATERING DEVICE the user then inserts stop 44 into release aperture 42. Lid 20 of container 48 is then removed from top section 28 exposing filling aperture 34. A hose or faucet can be used to fill container 48 through filling aperture 34. When container 48 is filled, the user screws lid 20 back onto top section 28 of container 48. When lid 20 is screwed back onto top section 28, male threads 32 of container 48 engage with female threads 26 of lid 20. Top edge 30 of container 48 will compress o-ring 22 in lid 20 creating an air-tight seal. The user can then roll device 50 back to the desired animal watering area. If the user removed container 48 from tray 52 to fill, then the user would re-seat container 48 back into tray 52 orienting release aperture 42 to face dish 60 as illustrated in FIG. 5. The user then removes stop 44 from release aperture 42 allowing the water to flow from container 48 into dish 60. The water flows into dish 60 until the water completely covers release aperture 42 forming a water seal. At this point the water will stop flowing from container 48 to dish 60. The water seal and the air-tight seal at the top section of container 48 create a vacuum within container 48 above the water line in container 48. This combined with the atmospheric pressure exerted on the water in dish 60 prevents the water from flowing in accordance with standard barometric principles. When the water level in dish 60 decreases to the point where air can enter container 48 through release aperture 42, air will enter container 48 and allow the water to flow to dish 60 until release aperture 42 is completely covered with water.

The animal drinks from dish 60 of tray 52. As the water level decreases in dish 60 below release aperture 42, air enters container 48 and water flows from container 48 into dish 60. Thus container 48 continuously supplies water to dish 60 of tray 52. When container 48 and dish 60 are empty, the user inserts stop 44 into release aperture 42 and repeats the water filling process as described.

In operation as an animal FEEDING DEVICE for dry food the user rolls device 50 to the food source. If more convenient the user can remove container 48 from tray 52 and carry container 48 to the food source.

Lid 20 covering top section 28 of container 48 is then removed exposing filling aperture 34. The user fills container 48 with food through filling aperture 34. When container 48 is filled, the user screws lid 20 back onto top section 28 of container 48. Lid 20 is screwed on and male threads 32 of container 48 engage with female threads 26 of lid 20. Top edge 30 of container 48 will compress o-rings 22 in lid 20 creating an air-tight seal keeping the food fresh and safe from insects and the elements. The user can then roll device 50 back to the desired animal feeding area. If the user removed container 48 from tray 52 to fill, then the user would re-seat container 48 back into tray 52 as illustrated in FIG. 4.

At the animal feeding time, the user will unscrew lid 20 and manually place the food from container 48 directly into dish 60. When container 48 is empty, the filling process is repeated.

ADDITIONAL EMBODIMENTS

FIGS. 2, 9, 9a, 10, 10a

Figure 2:
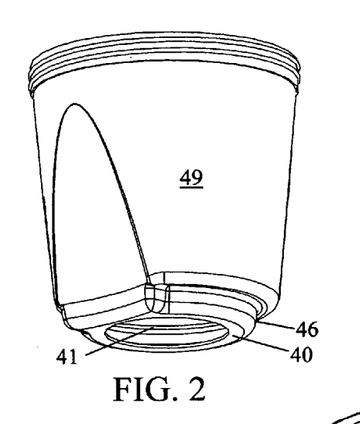
FIG. 2 is a perspective view of an additional embodiment of the storage container as a gravity feed storage container.

FIG. 2 illustrates an additional embodiment of container 48 of FIG. 3. FIG. 2 is a perspective view of a gravity feed storage container 49. Gravity feed container 49 of FIG. 2 is identical in many respects to container 48 of FIG. 3. Two differences exist between container 48 and feed container 49. The first difference is that feed container 49 is absent water release aperture 42. The second difference is that feed container 49 has a gravity feed aperture 41 in bottom wall 40. Feed aperture 41 enables the food to be delivered from feed container 49 to tray 52 in this additional embodiment of an animal feeding device.

All the operations described in the preferred embodiment as a FEEDING DEVICE are identical in many respects with one exception. The additional embodiment represented in container 49 of FIG. 3 automatically delivers food to dish 60. By gravity the feed is supplied from feed container 49 through feed aperture 41 and is delivered down sloping ramp 68 into dish 60. As the animal consumes the food, dish 60 is replenished until feed container 49 is empty.

FIGS. 9 and 9a represent an alternative embodiment of container 48. A Storage Container with double wall construction 47 is depicted in FIG. 9 with a sectional view. Double wall construction provides a container cavity 71 or hollow space between the walls of container 47. Cavity 71 can be injected with foam insulation or other material that can aid in regulating the temperature of the contents in container 47.

Container 47 in operation is identical to the preferred embodiment and in addition can assist in regulating the temperature of its contents, especially water. When cavity 71 of container 47 is injected with foam insulation for example, water temperature in container 47 can be maintained for a period of time and delivered to dish 60. On hot days the user may choose to fill container 47 with water and ice so the animals may be refreshed with cool water during the day. In colder climates, the user may choose to fill container 47 with heated water to help prevent dish 60 from freezing over.

Figure 10A:
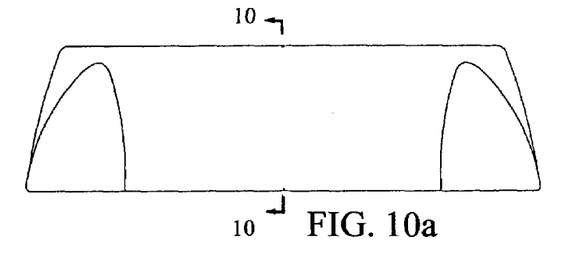
FIG. 10a is an orthogonal side view of the serving tray using double wall construction.

FIGS. 10 and 10a represent an alternative embodiment of serving tray 52. Serving tray 53 with double wall construction is depicted with a sectional view in FIG. 10. Double wall construction provides a tray cavity 70 or hollow space between the double walls of tray 53. Cavity 70 can then be infused with water, insulation or some other material that can aid in regulating the temperature of dish 60 and its contents.

Serving tray 53 in operation is identical to the preferred embodiment and in addition can assist in regulating the temperature of the dish contents, especially water. If cavity 70 of tray 53 is infused with water, for example, tray 53 can be frozen and then operated as a stand alone watering dish 60 cooling the water in it, or in conjunction with water dispensed by container 48. This is particularly important in warmer climates. Given a choice animals prefer cool water. Conversely in cold climates, if cavity 70 is injected with insulation, tray 53 can help inhibit the animal drinking water from freezing. Tray 53 in combination with container 47 gives the user greater opportunities to control and, or adjust the water temperature as required or desired for their animals.

ADVANTAGES

From the description above, a number of advantages of the disclosed animal feeding and watering device become evident:

(a) This animal feeding and watering device has substantial storage capacity and is easy to fill, move and clean.

(b) The air-tight seal on the storage container keeps the food fresh and protects it from insects and the elements.

(c) This animal feeding and watering device is designed such that its components, the storage container and serving tray, will nest closely within other like components thereby decreasing the volume occupied in shipping and storage thus reducing costs.

(d) The animal feeding and watering device utilizes the same production molds for manufacturing which reduces the costs associated with multiple production runs using different molds.

CONCLUSIONS, RAMIFICATIONS AND SCOPE

Accordingly, the examiner will see that the animal feeding and watering device can be used with a heavy volume of dry food or liquid easily and conveniently. In addition the components of the device are designed to reduce costs in the manufacturing, distribution and inventory management of the device. Thus the reader will see that the animal food and watering device provides a highly reliable, user friendly yet economical device that can be used by pet owners of almost any age.

While my above description contains many specificities, these should not be construed as limitations on the scope of the invention, but rather as an exemplification of one preferred embodiment thereof. Many variations are possible such as:

1) a solar panel affixed to the storage container which can heat the water inside for use in cold environments;

2) extra large wheels mounted underneath the tray would enable the animal feeding and watering device to be rolled onto uneven terrain or sand;

3) a means to push or pull the device can aid in the movement and direction of the device; and 4) multiple serving dishes configured on the serving tray would enable feeding and watering to multiple animals simultaneously.

Accordingly, the scope of the invention should be determined not by the embodiment(s) illustrated, but by the appended claims and their legal equivalents.

What is claimed is:

1. An animal watering device comprising:
   a tray adapted to rest securely on a flat surface, said tray having a forward feeding compartment having a bottom wall at a first level of height with respect to said device, a rearward receiving compartment having a support surface at a second level of height higher than said first level of height, and a tray ledge at a third height higher than said second height; and
   a storage container extending axially above said tray wherein said container has a lower section having a bottom and periphery configured to be received in said rearward receiving compartment wherein said bottom of said lower section contacts said support surface of said rearward receiving compartment, said lower section further including a water release aperture and a removable stop dimensioned to be inserted into said water release aperture to create an airtight seal therewith, and an upper section having a larger circumference than a circumference of said lower section, wherein a portion of a bottom of said upper section is supported by said tray ledge.

2. The device of claim 1, wherein said tray is dimensioned to nest closely within other said trays.

3. The device of claim 1, wherein said container is generally conical in shape.

4. The device of claim 1, wherein a cross section dimension of said container increases from a bottom thereof to a top thereof.

5. The device of claim 1, wherein said tray further comprises a plurality of removable, spaced apart, rotatable wheels mounted thereunder for enabling said device to roll along a surface.

6. The device of claim 1, wherein said container further comprises a a filling aperture at the top of said upper section, said device further comprising a removable cover with seal, configured to cover and seal said filling aperture.

7. The device of claim 6, wherein said filling aperture is of sufficient size to enable access by an adult human hand to the interior of said container for the purpose of filling or cleaning.

8. The device of claim 6, wherein said removable cover, when attached to said container, creates an air tight seal between said upper section and said cover.

9. The device of claim 1, wherein said receiving compartment has a shape corresponding to a shape of said lower section, to receive and hold by friction the lower section of said container in a single, correct position.

10. The device of claim 1, wherein said feeding compartment bottom wall and said receiving compartment support surface are connected by a sloping-ramp and wherein said feeding compartment and said receiving compartment are configured to be in liquid flow communication therebetween.

11. An animal care device comprising:
    a tray adapted to rest securely on a flat surface, said tray having a forward feeding compartment and a rearward receiving compartment;
    a storage container extending axially from a bottom end to a top end above said tray, said bottom end being received in said rearward receiving compartment, wherein a cross section dimension of said container increases from said bottom end to said top end, said top end having a greatest cross section dimension and defining a filling aperture, and a water dispensing aperture formed in a bottom end portion of said storage container, said water dispensing aperture having a perimeter smaller than a perimeter of said bottom end; and
    a removable, sealing cover configured to cover and seal said filling aperture, forming an air-tight seal therewith.

12. The device of claim 11, said device further comprising a removable stop configured to cover said water releasing aperture.

13. The device of claim 11, wherein said container is generally conical in shape.

14. The device of claim 11, further comprising a plurality of removable, spaced apart, rotatable wheels mounted to said tray to facilitate rolling said device over a surface.

15. The device of claim 11, wherein said container is configured to nest within another container, wherein said another container is dimensioned the same as said container.

16. The device of claim 11, wherein said rearward receiving compartment comprises a bottom support surface and a tray ledge at a level higher than said bottom support surface, said container having a lower section having a bottom and periphery configured to be received in said rearward receiving compartment wherein said bottom of said lower section contacts said bottom support surface of said rearward receiving compartment; and wherein said container further includes an upper section having a larger circumference than a circumference of said lower section, wherein a portion of a bottom of said upper section is supported by said tray ledge.

17. A plurality of animal care devices compactly arranged for storing or shipping, comprising:
   a plurality of trays nested within one another; and
   a plurality of storage containers nested within one another;
   wherein each said tray is dimensioned the same as all other of said plurality of trays and is adapted to rest securely on a flat surface, each said tray further having a forward feeding compartment and a rearward receiving compartment; and
   wherein each said storage container is dimensioned the same as all other of said plurality of storage containers and configured to extend axially above one of said trays when contained thereby, each said storage container having a bottom end and a top end, wherein a cross section dimension of said container increases from said bottom end to said top end, said top end having a greatest cross section dimension and defining a filling aperture; and
   wherein each said container further comprises a water releasing aperture near the bottom of said container.

18. The devices of claim 17, wherein each said storage container further comprises a removable stop configured to cover said water releasing aperture.

19. The devices of claim 17, together with a plurality of removable, sealing covers configured to cover and seal said filling apertures of said respective storage containers.

20. The device of claim 17, further comprising a plurality of removable wheel sets adapted to be installed under said trays during use to allow rolling the devices over a surface.

* * * * *